May 7, 1929.　　　　L. V. PENCE　　　　1,712,091
SUPERCHARGER AND AIR CLEANER
Filed Dec. 15, 1924　　　2 Sheets-Sheet 1
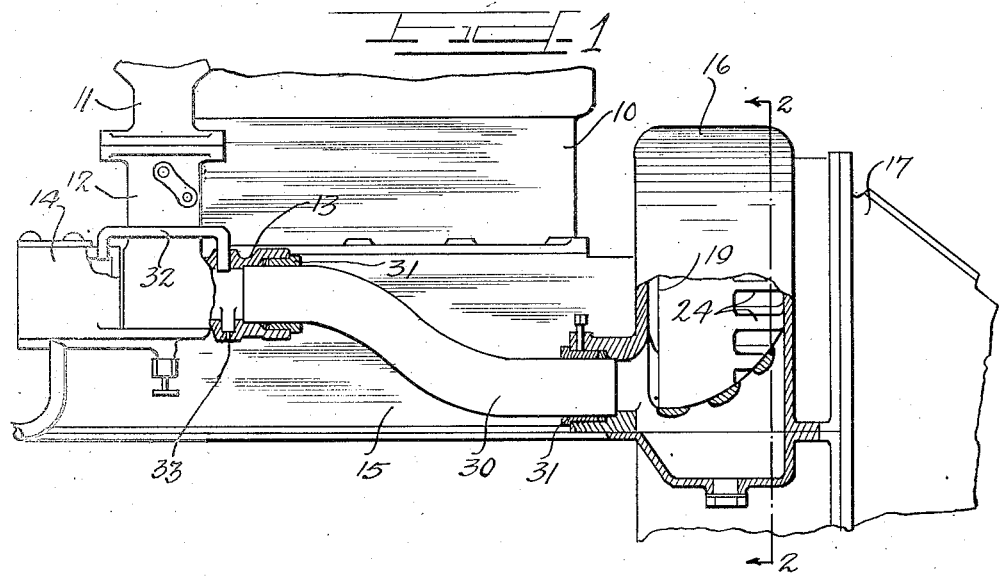
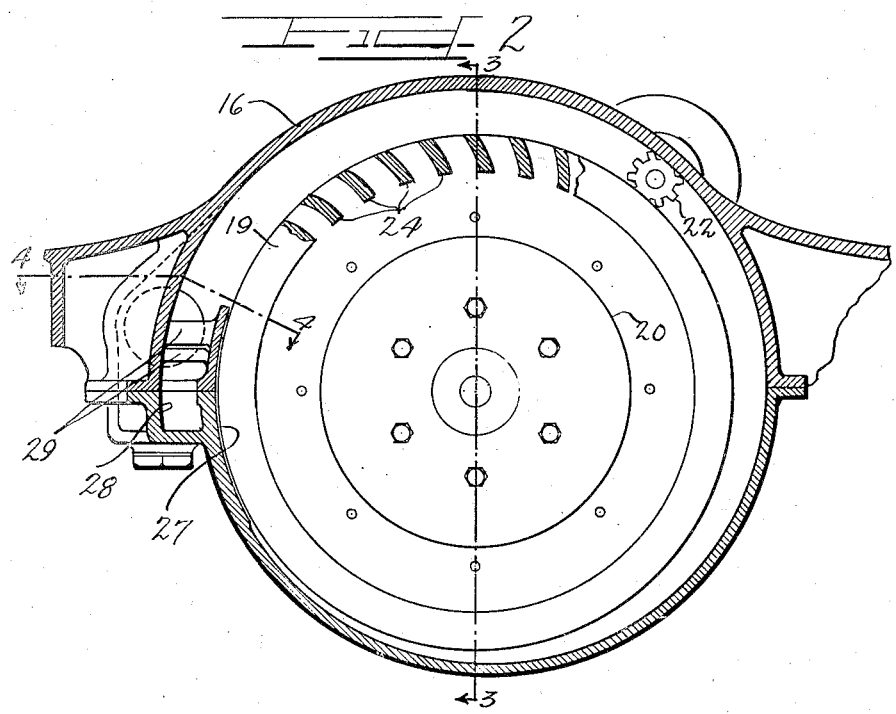
Inventor
Lafe V. Pence

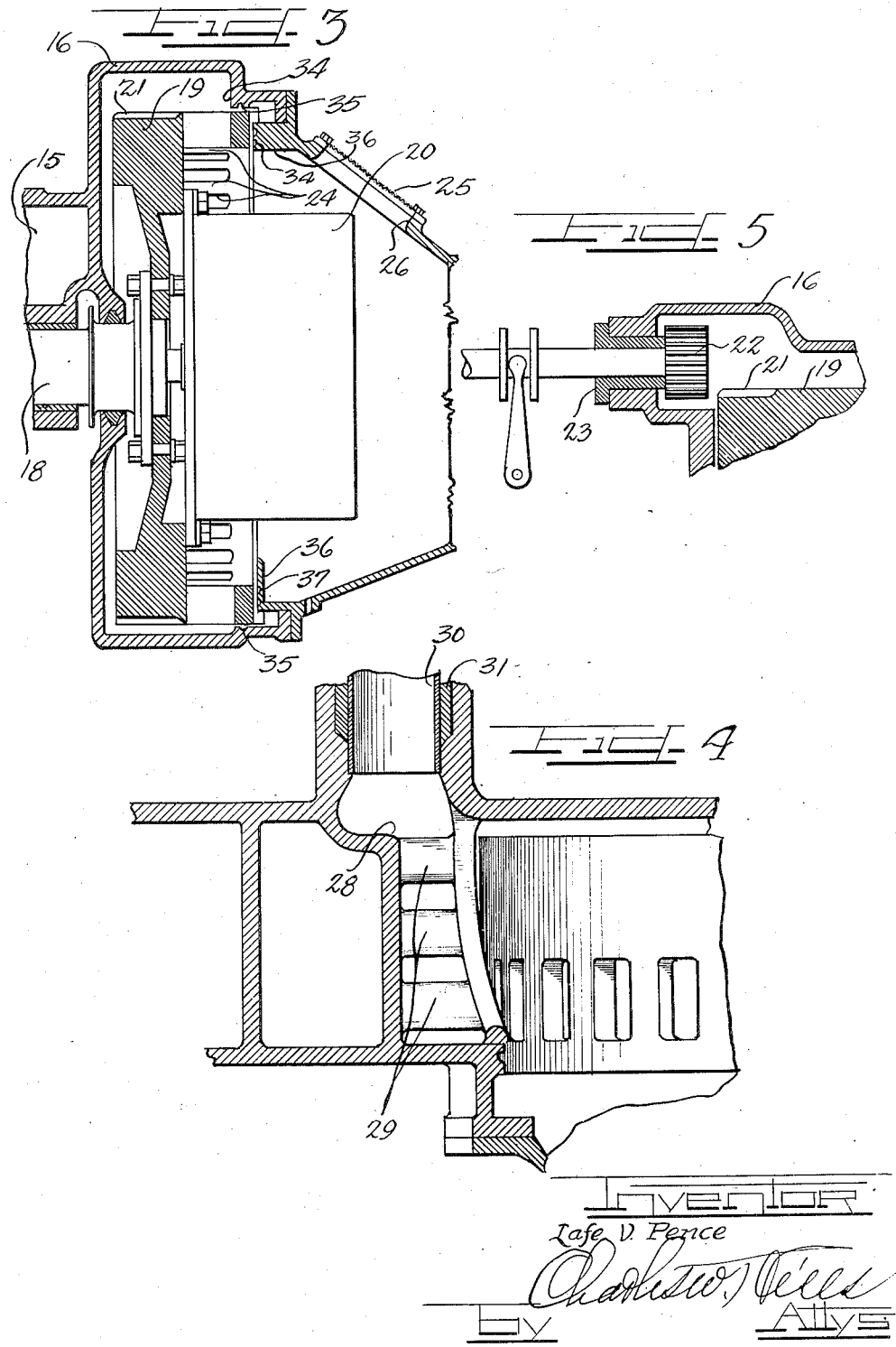

Patented May 7, 1929.

1,712,091

UNITED STATES PATENT OFFICE.

LAFE V. PENCE, OF EL PASO, TEXAS.

SUPERCHARGER AND AIR CLEANER.

Application filed December 15, 1924. Serial No. 755,852.

This invention relates to a supercharger and air cleaner for supplying air to internal combustion engines.

It is an object of this invention to utilize the flywheel of an internal combustion engine as the rotor of a centrifugal air pump serving to supercharge the cylinders of the engine. Supercharging of internal combustion engines as heretofore practiced required a pump or blower with resultant added friction and driving losses due to the driving mechanism therefor.

It is also an object of this invention to provide a centrifugal air compressor adapted to separate dust and foreign matter from the air thus serving as an air cleaner. Heretofore when air cleaners have been used it has been found that they necessarily obstruct the passage of air and therefore increase the manifold pressure drop with a consequent decrease in the volumetric efficiency and power of the engine. This invention overcomes this power loss by providing suitable pumping blades in association with the flywheel to give high velocity and pressure to the air and forming the bell housing as a collecting chamber with a deflecting passage having ports permitting separation and passage of foreign particles into a collecting chamber. The supercharging effect of the compressed air in the engine cylinders much more than offsets the power required to compress the air so that the net power of the engine is increased and the advantages of an air cleaner obtained at the same time.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary side elevation of an internal combustion engine with parts broken away to show the application of the device of this invention thereto.

Figure 2 is an enlarged section on line 2—2 of Figure 1.

Figure 3 is a section on line 3—3 of Figure 2.

Figure 4 is an enlarged section on line 4—4 of Figure 2.

Figure 5 is a fragmentary detail section of the starting gear.

As shown on the drawings:

The parts of an internal combustion engine shown in Figure 1 comprise the cylinder block 10, carburetor flange of the intake manifold 11, the carburetor 12 including the air inlet 13 and float chamber 14, the engine crankcase 15, the flywheel bell housing 16 and the end of the transmission housing 17 that bolts to the bell housing. The engine crankshaft is indicated at 18 together with a flywheel 19 and a disc clutch housing 20. The flywheel is provided with the usual peripheral gear teeth 21 to be engaged by a starter pinion 22 having an air tight bearing 23 in the wall of the bell housing.

The flywheel 19 is provided with a series of blades 24 preferably integral therewith and formed along the general lines required to produce high pressure in the air passing therethrough. The air supplying the pumping flywheel is taken through a screen 25 which may also form a cover for the usual inspection opening 26 for adjusting the clutch. The bell housing 16 is formed of a volute or spiral outline as shown in Figure 2, starting with the minimum practical clearance at 27 uniformly increasing in area around the flywheel to transpose the kinetic energy of the air into pressure with the minimum eddy loss. The spiral or volute terminates in a pocket 28 to receive foreign matter thrown out by the inertia thereof when the compressed air is deflected from a circular path by means of a series of baffles 29, the air discharging from the housing through a pipe 30 leading to the carbureter air inlet 13, suitable packing members 31 being used in sealing the pipe joints.

The carbureter float chamber 14 is sealed except for a vent pipe 32 leading to the air inlet 13 in order to balance the air pressure to allow proper flow at the fuel jets. A small drain hole 33 is provided at the bottom of the air inlet so that in case the float chamber is flooded the fuel will not drain into the air pumping mechanism where a possible back fire from the carbureter might cause ignition.

The open side of the bell housing is brought as close to the periphery of the flywheel outside the pump blades as is practical, as shown at 34, and a groove 35 is provided therein to form an air seal. To further seal this joint by forming a labyrinth passage, the transmission housing 17 is provided with a flange 36 projecting into close proximity with the side of the flywheel 19 and provided with air seal grooves 37 similar to the groove 35.

The operation is as follows:

The high peripheral speed of the flywheel under conditions calling for the excess power made available by supercharging the engine cylinders to initial pressures above atmospheric renders the flywheel a highly satisfactory rotor for a centrifugal blower, substantial air pressures being obtainable under such conditions with properly shaped fan blades. A radial blade gives medium pressure and volume, a backwardly curved blade low pressure and large volume, and a forwardly inclined blade, as shown in the drawings, gives a relatively high air pressure with sufficient volume for supercharging purposes.

The abrupt change in the direction of air flow because of the right angle outlet and the deflecting blades serves to centrifugally purify the air, the dust particles being literally thrown out of the air stream into the collecting pocket. The fan itself also serves as a dust separator as the particles of foreign matter are thrown against the walls of the housing and tend to flow therealong until they reach the collecting pocket.

The action of the carburetor proper is not affected by the supercharging if the float chamber is sealed and subjected to the supercharger pressure.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A supercharger of the class described, comprising a centrifugal air compressor having a revolvable member with a plurality of forwardly curved air impellers around the periphery thereof, a volute casing housing the revolvable member, a side-discharge outlet in the periphery of the casing and within the zone of maximum air pressure in the volute, and a baffle in the casing and within the zone of maximum air pressure to deflect foreign matter thrown out by the impellers whereby to prevent the foreign matter being carried by the air through the discharge outlet.

2. In combination with a centrifugal air compressor having a revolvable member with a plurality of forwardly curved members around the periphery thereof and the volute casing housing the revolvable member, a side-discharge outlet in the periphery of the casing and in the zone of maximum air pressure in the casing, a collecting pocket formed in the casing and terminating the volute, the pocket being positioned beyond the outlet and in line with the plane of the impellers to collect foreign matter thrown out by the impellers, and baffles positioned in the casing between the outlet and the pocket to deflect foreign matter into the pocket and to prevent the foreign matter being carried by the air through the discharge outlet.

In testimony whereof I have hereunto subscribed my name.

LAFE V. PENCE.